S. GABRIEL.
EDUCATIONAL DEVICE.
APPLICATION FILED JAN. 18, 1915.
1,232,021.
Patented July 3, 1917.
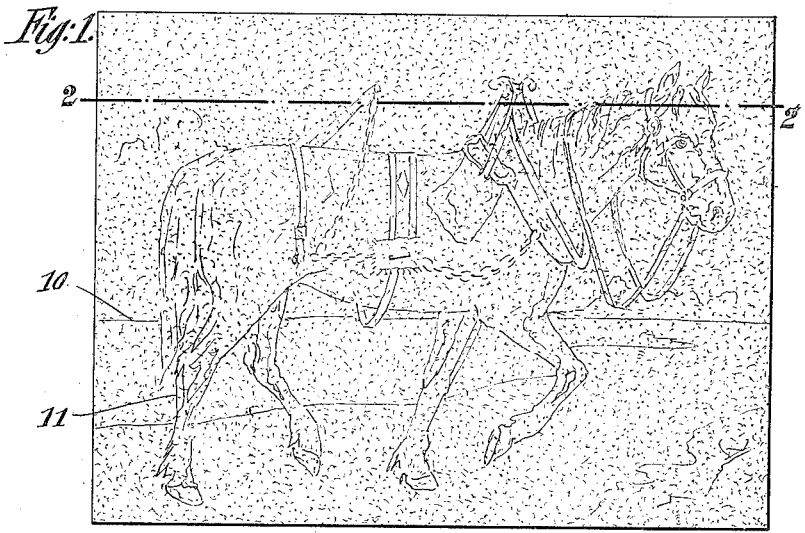
Fig.1.
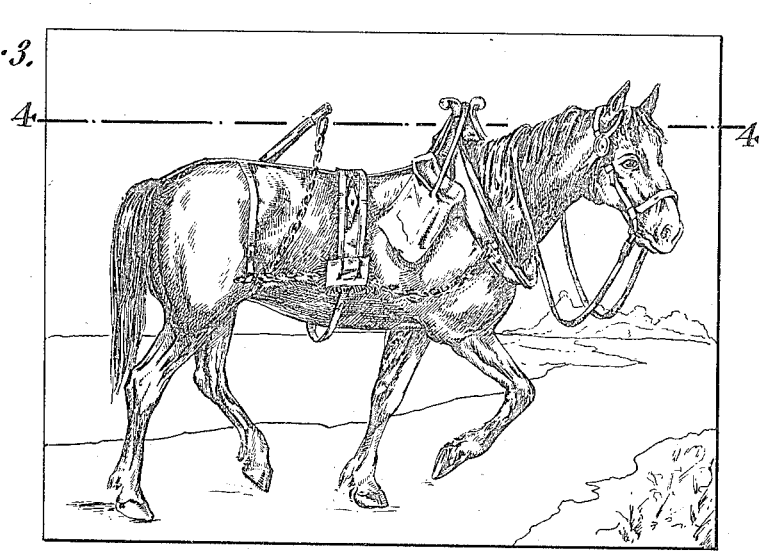
Fig.3.
Fig.4.
Witnesses:
Inventor
Samuel Gabriel,
By his Attorney C. P. Goepel

UNITED STATES PATENT OFFICE.

SAMUEL GABRIEL, OF NEW YORK, N. Y.

EDUCATIONAL DEVICE.

1,232,021.  Specification of Letters Patent.  Patented July 3, 1917.

Application filed January 18, 1915. Serial No. 2,886.

*To all whom it may concern:*

Be it known that I, SAMUEL GABRIEL, a citizen of the United States, and a resident of New York, borough of Manhattan, county and State of New York, have invented certain new and useful Improvements in Educational Devices, of which the following is a specification.

This invention relates to an amusing educational device for children, enabling them to develop somewhat by their own efforts, pictorial representations of various objects.

The object of the invention is to improve or develop the memory of a child respecting the general characteristics of the article depicted.

In the accompanying drawings,

Figure 1 is a plan view of a page of my improved picture painting book before it is used by the child, Fig. 2 is a cross section taken on line 2—2 of Fig. 1, Fig. 3 shows a view of the same page after the child has completed its operation, and Fig. 4 is a cross sectional view taken on the line 4—4 of Fig. 3.

Similar reference numerals indicate corresponding parts throughout the several figures.

This device comprises a base sheet $a$ composed of paper, cardboard or other suitable material having a series of superposed coatings $b$, $c$ and $d$ thereon.

The primary coating $b$ is in the form of an impression representing a picture in permanent colors. This coating is applied by printing, lithographing or equivalent process. The picture may represent a horse for instance or any other object useful for the amusement, entertainment and instruction of a child.

The secondary coating $c$ consists of a solid opaque color composed of soluble material such as chalk and lime in substantially equal proportions superposed on said primary coating and serving to conceal the picture thereof.

The tertiary coating $d$ is a skeleton coating and constitutes an outline in permanent colors of the original picture disposed in register therewith. The lines 10 and 11 represent the outline coating in the device as shown in Fig. 1.

The device as thus constructed presents on its face a general outline of the object which is represented in colors in the primary concealed coating, as for instance, the general outlines of a horse enables the child to recognize that the object of his talent is being directed to the presentation of a horse. Similarly with a cow, donkey, steer, etc. After a page has been prepared as I have just described, namely, with a coating and a printed general outline on the coating, the child takes a brush of the usual kind, and dipping it in water or other suitable solvent, assiduously applies it to the plate. Thereby the coating becomes dissolved, and being joined with the water in liquid form may be readily removed by the aid of a clean piece of blotting paper. This is carried on until the complete coating is removed, and the result is that a very attractive printed or lithographed picture in color is produced, and the young student gradually arrives at the conclusion that it was the result of its efforts that the beautiful color plate was produced.

After the several pages are coated, of course they can be bound up in the form of a book of any suitable size.

A preferred embodiment of my invention has the coating arranged in such strength that it takes about a half hour to remove the coating by the aid of the brush and blotting paper referred to, so that the child is engaged for a considerable time in perfecting his apparent work of art.

By the improvements described, a source of interesting amusement and delightful surprises for children are obtained, which at the same time afford educational advantages.

I have shown an embodiment of my invention, but it is clear that changes may be made therein without departing from the spirit of the invention as defined in the appended claim.

I claim:

An entertaining educational device for a child consisting of a sheet having three several superposed coatings thereon, namely, a primary coating or impression containing a picture in permanent colors, a secondary coating consisting of a solid opaque color composed of soluble material superposed on said primary coating and serving to conceal the picture thereof, and a tertiary skeleton coating superposed on said secondary coating and constituting an outline of said original picture disposed in register therewith, said tertiary coating serving as a guide for the production by dissolution and absorption of the full line picture disposed underneath the secondary coating and corresponding with said tertiary coating.

In testimony that I claim the foregoing as my invention, I have signed my name in presence of two subscribing witnesses.

SAMUEL GABRIEL.

Witnesses:
R. GOLDSTEIN,
E. WUNDERLICH.

Copies of this patent may be obtained for five cents each, by addressing the "Commissioner of Patents, Washington, D. C."